Aug. 22, 1967    N. C. JECKEL    3,337,673
UNIFORMLY CORRUGATED PROSTHESIS AND PROCESS OF MAKING SAME
Original Filed Oct. 31, 1962

INVENTOR.
NORMAN C. JECKEL
BY
Corey, Hart + Stemple
ATTORNEYS

# United States Patent Office 3,337,673
Patented Aug. 22, 1967

3,337,673
UNIFORMLY CORRUGATED PROSTHESIS AND PROCESS OF MAKING SAME
Norman C. Jeckel, Glens Falls, N.Y., assignor, by mesne assignments, to United States Catheter & Instrument Corporation, Glens Falls, N.Y., a corporation of Delaware
Continuation of application Ser. No. 238,071, Oct. 31, 1962. This application Dec. 20, 1965, Ser. No. 520,032
19 Claims. (Cl. 264—324)

This application is a continuation of my co-pending application, Ser. No. 238,071, filed Oct. 31, 1962, now abandoned, which was a continuation-in-part of my co-pending application, Ser. No. 752,370, filed July 31, 1958, now abandoned.

This invention relates to new and useful improvements in artificial blood vessel grafts and is more particularly concerned with corrugated or crimped grafts where the corrugations are smooth and uniform.

The recent expansion of vascular surgery has increased the need for blood vessel substitutes, particularly arteries, and artery banks have been established for this purpose. Homografts (natural blood vessels) have been used to a certain extent but such use is greatly restricted by limited supply, time and expense that is connected therewith. Since the supply of homografts is limited, it is extremely difficult to match the varieties of size and shapes of blood vessels that may be necessary during surgery, the size of which may not be known prior to surgical entry.

The normal blood vessel is an extremely tough and resilient organ which must be flexible and elastic but at the same time strong and non-collapsible. The varied properties of the normal blood vessel is particularly emphasized at the joints, having an extensive range of movement, e.g. the hip joint between the legs and the primary body trunk. In fact, one of the common but difficult locations for blood vessel substitution has been the aortic bifurcation where the aorta divides into the iliac arteries to supply each leg.

It was only natural that attempts be made to secure synthetic blood vessels to be used on a surgical basis. Many materials have been suggested but nylon (polyhexamethylene adipamide) appears to be the first to have been utilized on a commercial basis. Since that time other materials have been developed or suggested, including "Dacron" (Dupont trademark for polyethylene glycol terephthalate), "Orlon" (Dupont trademark for polyacrylonitrile) and "Teflon" (Dupont trademark for tetrafluoroethylene resin). Various other materials have been suggested, but these have been the leading ones.

Of these presently used materials, it has been found that Teflon causes the least tissue reactivity, retains greater strength over a period of time and with Dacron are the present materials of choice by the vascular surgeons.

The first blood vessel grafts on the market were generally made from nylon filaments, which could be braided, knitted or woven. However, these were subject to collapse generally and kinking particularly on flexion of the graft. Tapp then developed (U.S. Patent 2,836,181) a crimped or corrugated nylon graft (generally braided) to resist collapse and kinking. The corrugations were formed by placing a treated nylon tube or a rod and pushing the ends towards each other. The tube was then treated by heat or chemicals to set the corrugations so that they would be retained.

However, the grafts prepared by this method (which are commercially available today) have quite irregular corrugations which are also quite rough and sharp and thus will serve to irritate surrounding tissues where the artificial graft is placed. Thus, Harrison in 95 American Journal of Surgery 3 (1958) pointed out that the marked inflammatory reaction incited by nylon which was more prevalent with the crimped tubes eliminated much of the non-buckling advantage of the crimped tubes.

It is an object of this invention to provide corrugated or crimped synthetic blood vessel grafts wherein the corrugations are smooth and uniform in dimension.

It is also an object of this invention to provide a process for corrugating said grafts whereby the spacing and height of the corrugations can be readily controlled.

I have found that uniform and smooth corrugations may be formed on a flexible synthetic tube by wrapping same with a filament at spaced intervals and thereafter pushing the ends of the tube toward each other on a cylindrical rod. The filament may be a Teflon thread, thin wire, or most any flexible filament but must not react with the tube or have any other reactions during the process that will contaminate the artificial graft. The spacing and height of the corrugations will be largely controlled by the space between succeeding spirals of the filament and the extent to which the tube is shortened by pushing of the two ends toward each other.

It is necessary, of course, to fix the corrugations, which can be done by heat, chemical treatment, coatings or by any other methods used to fix corrugations.

With the above objects and others in view, the nature of which will be more apparent, the invention will be more fully understood by reference to the drawings, the accompanying detailed description and the appended claims.

Figure 1:
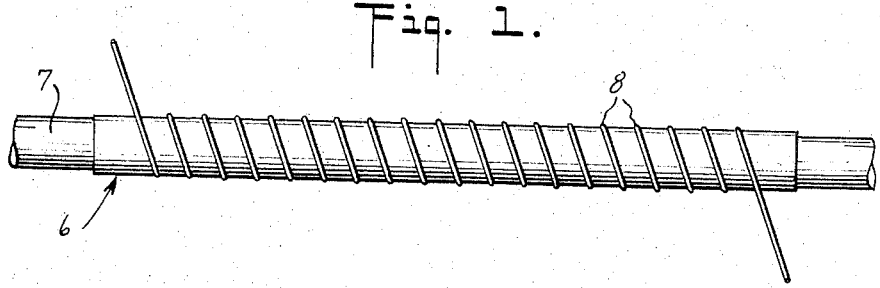
FIG. 1 is a perspective view of a synthetic tubular element mounted on a glass rod and wound by a filament in accordance with this invention.

Referring to the drawings in detail, this invention as illustrated is embodied in a corrugated white Teflon knitted tubing which is to be utilized in substituting grafts for blood vessels.

Figure 2:
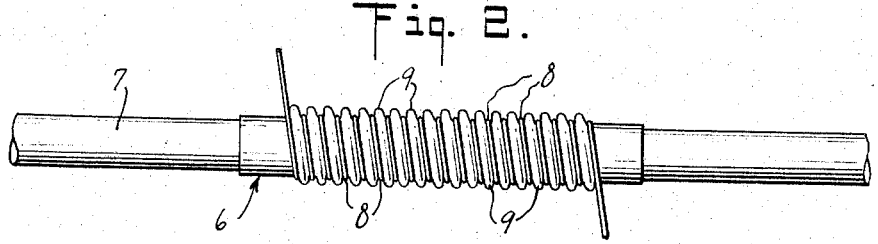
FIG. 2 is a perspective view subsequent to FIG. 1 after the tubular element has been shortened by pushing the ends toward each other.
Figure 3:
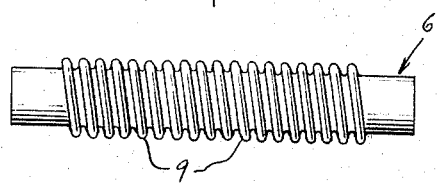
FIG. 3 is a perspective view of the corrugated tubular element after removal of the glass rod and filament.

A knitted tube 6 of Teflon is placed on a stainless steel rod 7 and is then wrapped with a Teflon thread 8 at about eight revolutions per inch as shown in FIG. 1. Then the ends of the tube are pushed toward each other so that the length is reduced about fifty percent while maintaining equal internal and external air pressure on said tube as shown in FIG. 2, whereby uniform and regular corrugations 9 are formed between the successive thread revolutions. The corrugations are then fixed by heating the entire unit shown in FIG. 2 to about 580°–610° F. which is near the softening point of Teflon. Such a heat treatment not only sets the corrugations but reduces the porosity of the tube and increases the tightness of the knit thereby maintaining a porous condition of said graft during said process. Thereafter, the fixed tube is cooled, the Teflon filament and the stainless steel rod removed to leave the corrugated member shown in FIG. 3 which is ready for use by the surgeon after sterilization which may be done by autoclaving, soaking in alcohol, etc. but will be done at approximately the same time as the surgery.

I prefer to use a knitted, Dacron or white purified Teflon tube because of the low reactivity of the purified Teflon and knitted tubes are seamless and need not have cut ends heat sealed before suturing to prevent fraying, which is a necessary step with woven or braided materials.

However, my novel method for corrugating tubing may be used on any flexible tubing whether formed from Teflon, nylon, Orlon, Dacron and various others or by knitting, weaving, braiding, extrusion or any other method for forming a flexible tube.

A Teflon thread has been used for wrapping the tube because it was readily available and inert to the materials involved. Any thread, wire or filament could be used as long as it does not react detrimentally during the process.

The fixing of the corrugations may be done in various ways, depending somewhat on the material of the tube. Nylon tubes are commonly set with 70 to 73% formic acid. A coating such as silicone or fluorocarbon resins may be used for any of the materials. When fixing by heating to the softening point, it will be found that the range is quite broad for a given material. Thus Teflon is from 450 to 625° F. and nylon and Dacron from 200 to 310° F.

The grafts may be made in Y, T or other shapes if needed, the aortic bifurcation being a common Y shape graft that is desired.

The height and spacing of the corrugations will be controlled by various factors, such as the reduction in length of the original tube, size and spacing of the wrapping filament, material and method of forming the tube, etc., as will be readily apparent to those in the art. I have found that a 35 to 65% reduction of the original tube length will generally provide satisfactory corrugations.

The tubes are made with diameters from about 3/16 to 1¼ inches. Below 3/16, the tube is apt to be closed by a thin lining of fibrin that is always deposited. Since the human aorta is only about 1¼ inches in diameter, there is little need for a larger size.

The corrugations range from 4 to 30 per inch in the set tube, generally being less with increased diameter. The most common range is about 15 to 18 per inch on about a 3/8 inch diameter tube.

I claim:

1. A process for corrugating a smooth flexible inert tubular prosthesis comprising an integral, 3/16 to 1¼ inch diameter, tubular-shaped, seamless graft of porous fabric on a rod, wrapping said graft at spaced intervals with an inert filament, reducing the length of said wrapped graft on said rod by bringing the ends toward the longitudinal center until corrugations form in said inter-filament spaces, fixing said graft in said corrugated position, and maintaining a porous condition of said graft during said process.

2. The process of claim 1 wherein said prosthesis is a blood vessel graft and said length reducing step is conducted with equal internal and external air pressure on said graft.

3. The process of claim 2 wherein said filament defines a continuous spiral path.

4. The process of claim 2 wherein said graft is air-permeable.

5. A process as claimed in claim 2 wherein said filament is polytetrafluoroethylene.

6. A process as claimed in claim 2 wherein said fixed graft has 4 to 30 corrugations per lonigtudinal inch.

7. A process as claimed in claim 6 wherein the reduction of said wrapped graft is 35 to 65% of the original length.

8. A process as claimed in claim 2 wherein said graft is made of a material selected from the group consisting of polytetrafluoroethylene, polyethylene glycol terephthalate, polyacrylonitrile and polyhexamethylene adipamide.

9. A process as claimed in claim 8 wherein said graft is formed of intertwined threads.

10. A process as claimed in claim 9 wherein said corrugated graft is fixed by heating to a point near the softening point of said material.

11. A process as claimed in claim 9 wherein said graft is polyethylene glycol terephthalate.

12. A process as claimed in claim 9 wherein said intertwined threads are knitted.

13. The process of claim 9 wherein said intertwined threads are woven.

14. The process of claim 9 wherein said intertwined threads are braided.

15. A process as claimed in claim 9 wherein said graft is polyhexamethylene adipamide.

16. A process as claimed in claim 15 wherein said corrugated graft is fixed by treating with 70–73% formic acid.

17. A process as claimed in claim 9 wherein said graft is tetrafluoroethylene.

18. A process as claimed in claim 17 wherein said corrugated graft is fixed by heating to about 450–625° F.

19. A process as claimed in claim 18 wherein said corrugated graft is fixed by heating to about 580–610° F.

References Cited

UNITED STATES PATENTS

| | | | |
|---|---|---|---|
| 1,128,480 | 2/1915 | Miller | 262—293 XR |
| 2,272,704 | 2/1942 | Harding | 18—19 |
| 2,347,101 | 4/1944 | Harding. | |
| 2,584,501 | 2/1952 | Roberts. | |
| 2,743,759 | 5/1956 | Snow et al. | 156—143 |
| 2,782,803 | 2/1957 | Rothermel et al. | |
| 2,836,181 | 5/1958 | Tapp | 128—334 |

ROBERT F. WHITE, *Primary Examiner.*

M. R. DOWLING, R. R. KUCIA, *Assistant Examiners.*